United States Patent Office 3,332,202
Patented July 25, 1967

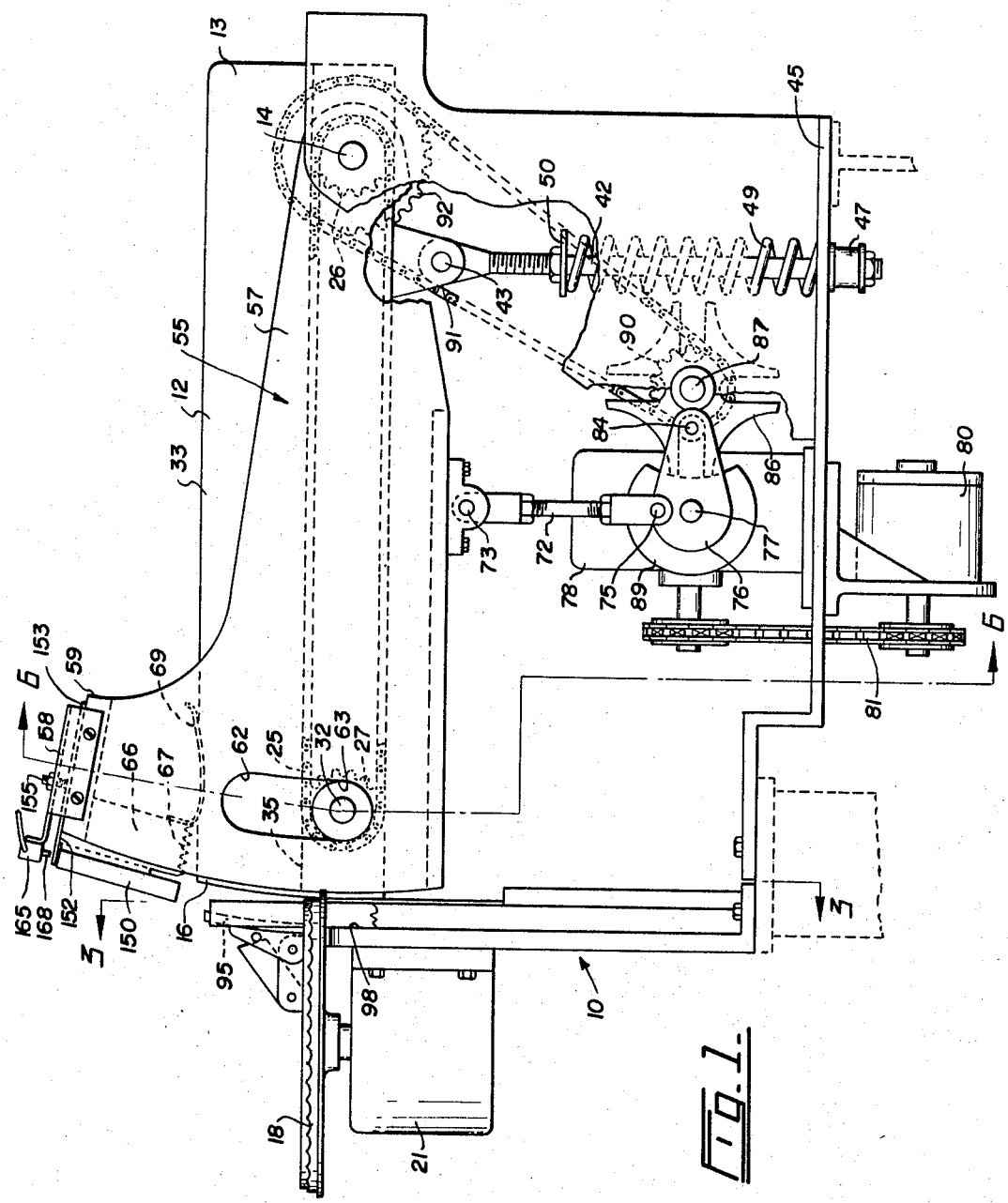

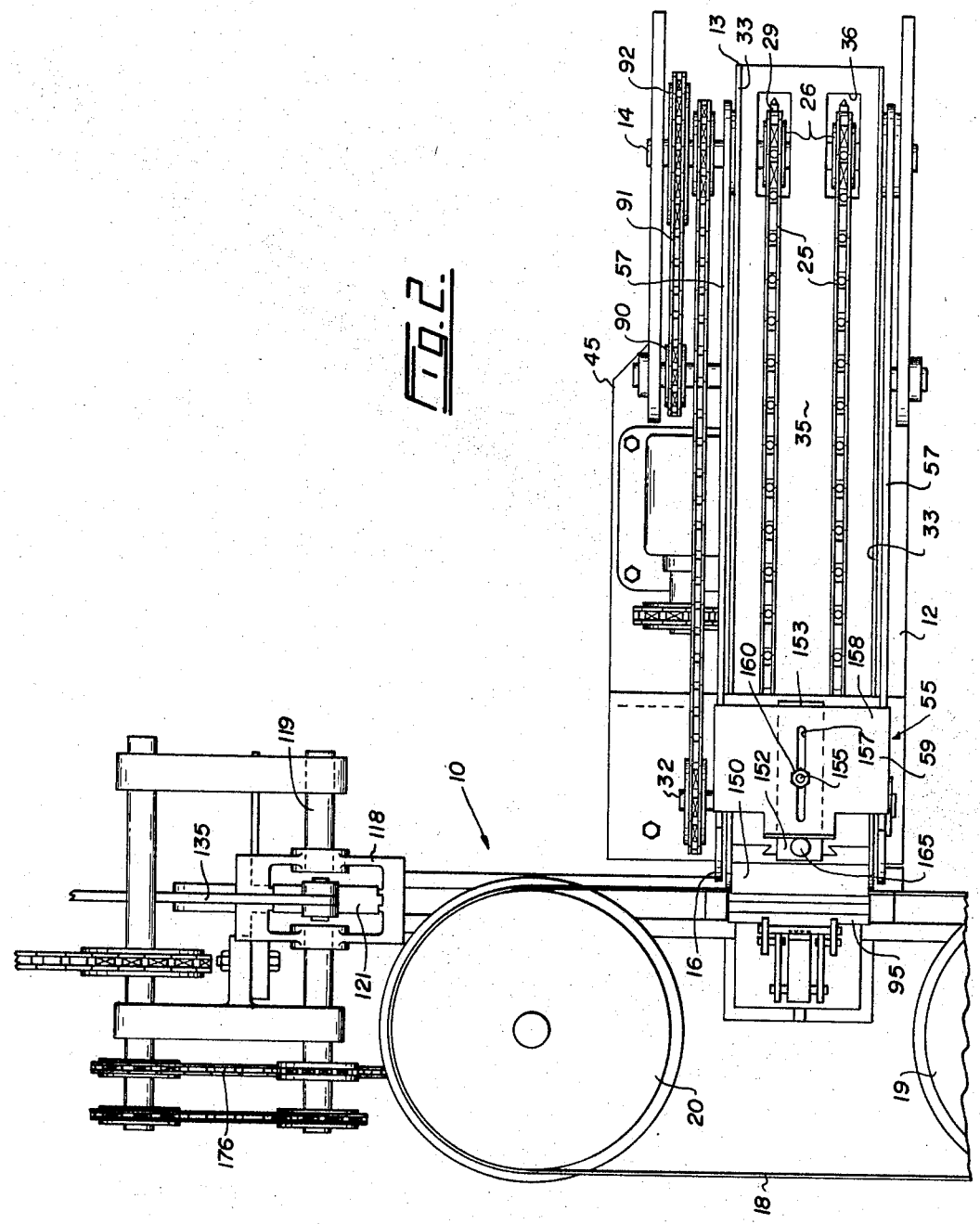

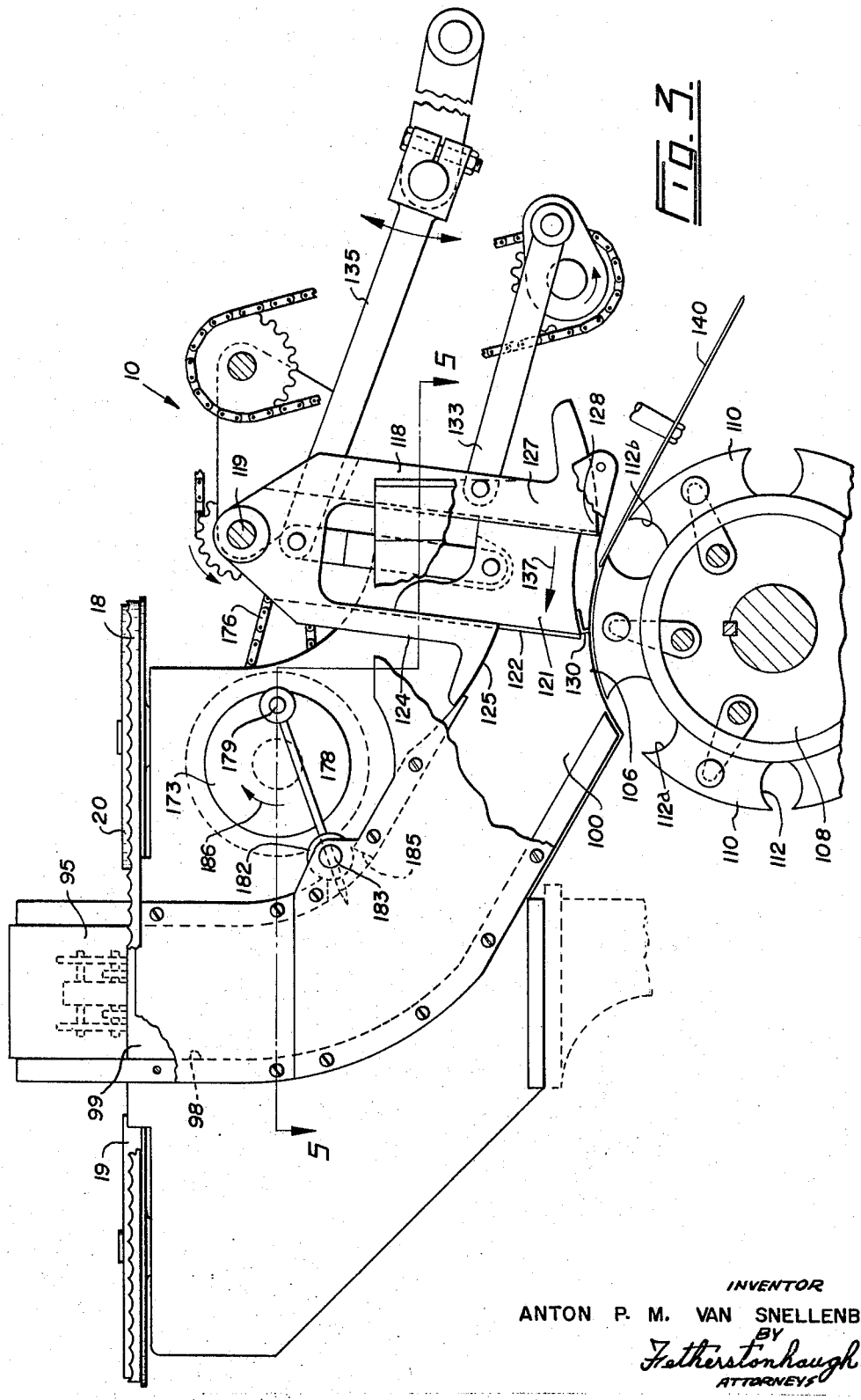

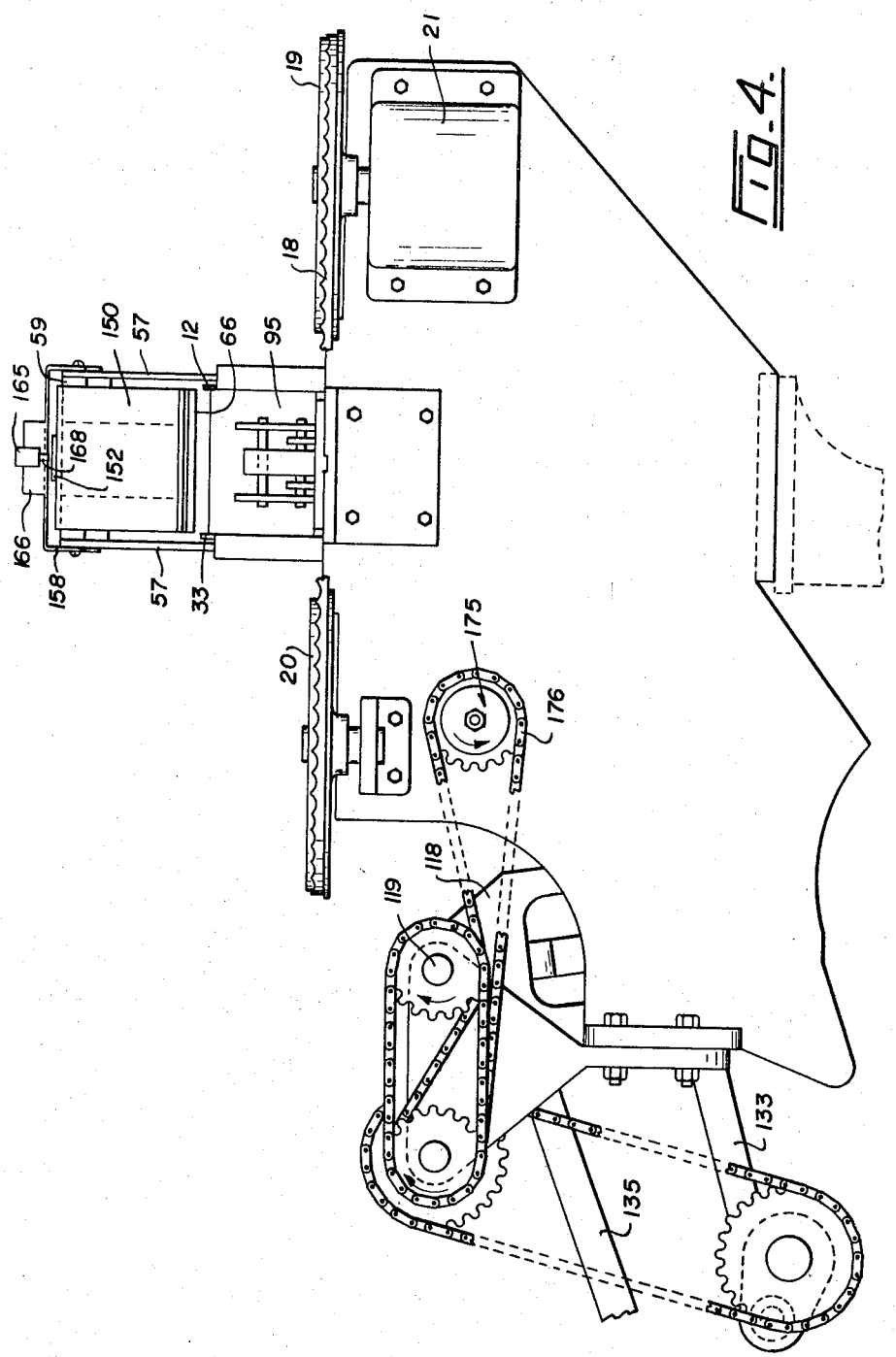

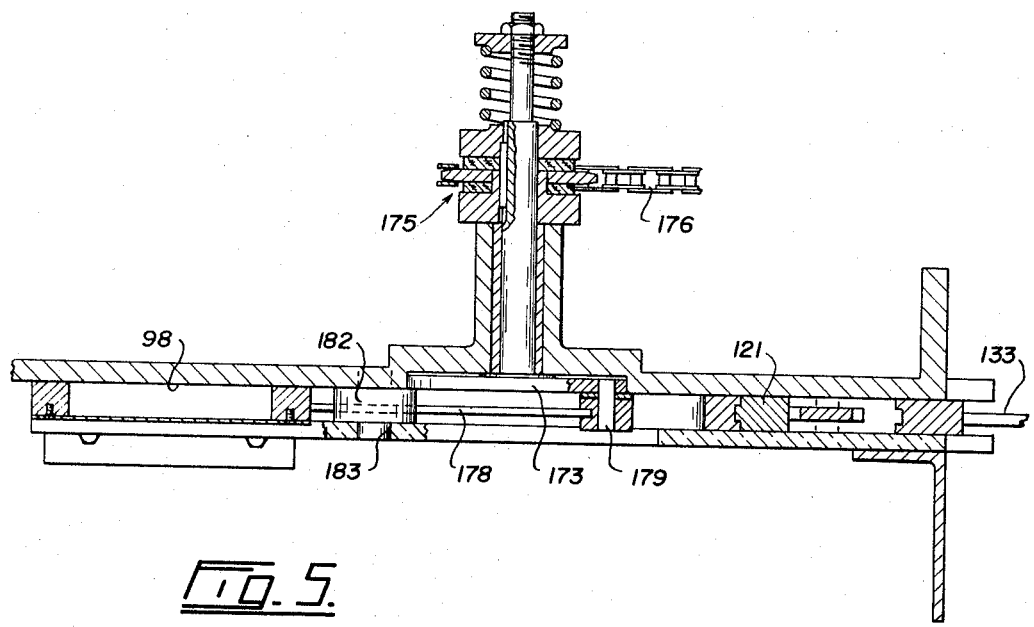

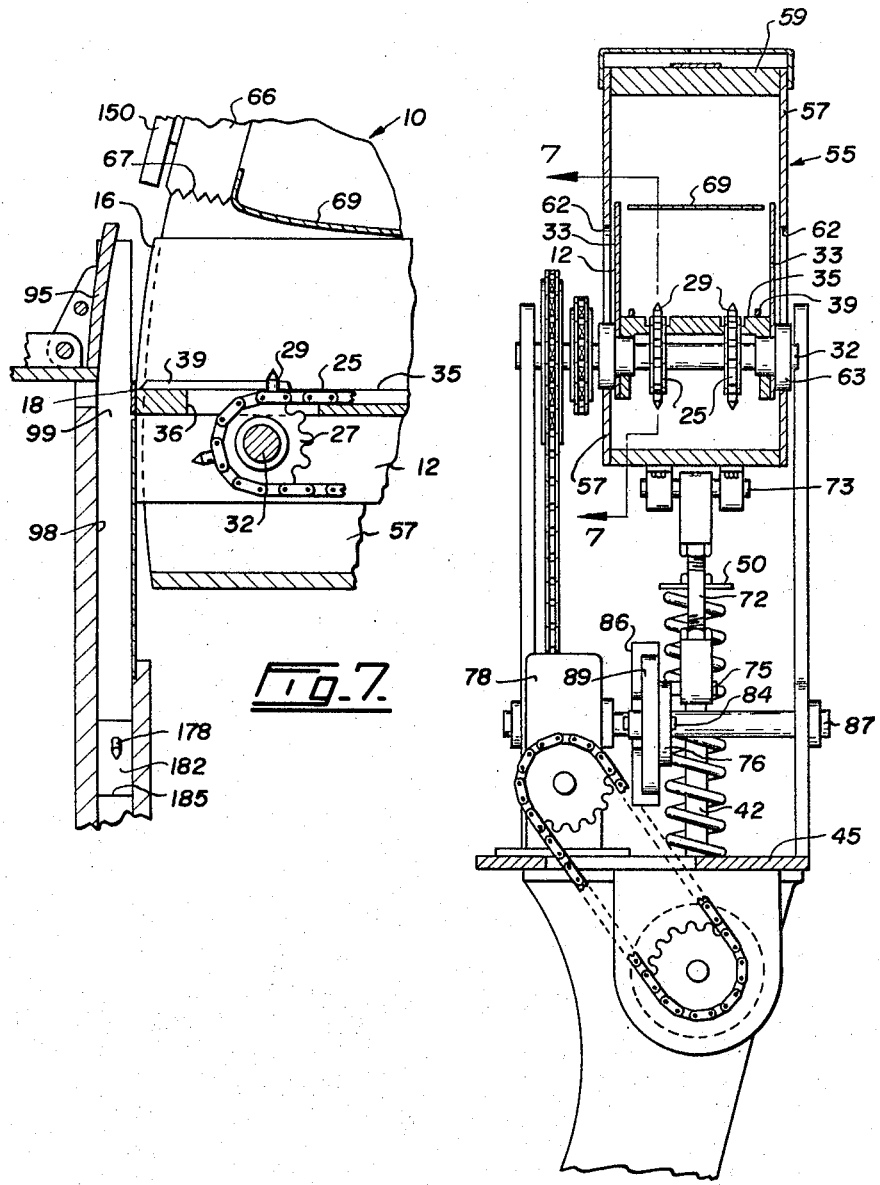

3,332,202
FISH CUTTING AND FEEDING APPARATUS
Anton P. M. Van Snellenberg, 5938 Alma Road,
Vancouver, British Columbia, Canada
Filed Jan. 6, 1964, Ser. No. 335,871
19 Claims. (Cl. 53—123)

This invention relates to apparatus for cutting fish into comparatively thin slice and feeding the slices to can-filling apparatus.

Fish have been automatically cut and fed into cans for quite some time. However, it has not been possible satisfactorily to cut comparatively thin slices for small cans, such as quarter pound cans, since the fish would tend to crumble or break up in the standard cutting machines. The reason for this is that there was not enough fish in the slice being cut off to stand up to the cutting action without breaking. Furthermore, the standard apparatus could not handle the comparatively thin slices in a satisfactory manner. As a result of this, quarter pound cans were usually filled by hand, thereby taking up too much time and labour. Apparatus according to the present invention is designed to cut comparatively thin slices off the fish, and to conduct these slices to the apparatus for stuffing them into the cans. This is done automatically, and yet the fish is not broken up by the cutting and handling operations and therefore does not clog or interfere with the operation of the apparatus.

This apparatus includes a substantially horizontal trough having feeding mechanism therein for moving each fish in an endwise direction towards an end of the trough. A cutter, usually an endless band saw blade operating in a horizontal frame, is located at said end of the trough. The fish is pushed against a stop near the cutter, and then the feeding mechanism is stopped. Following this, the end of the trough is swung downwardly, the fish being firmly held in the trough at this time. This downward movement moves the end of the fish through the cutter so that a slice of a desired thickness for a small can is cut off. The slice drops downwardly through a tunnel where it is kept on edge. The fish slices may move through the tunnel under the action of gravity alone, or suitable means can be provided at this tunnel for moving the fish downwardly therethrough. It is preferable to swing the lower portion of the tunnel into a substantially horizontal direction. Suitable means is provided for moving pockets into registry with the lower end of the tunnel and, at the same time, fish from the tunnel into each pocket. The fish is still on edge, and standard equipment is utilized to press the fish out of each pocket into a small can, e.g. a quarter pound can, this equipment having a piston which moves horizontally through each pocket to move the fish therefrom into a can which is aligned with the pocket and is held on edge with its open top facing the pocket.

The apparatus is described in more detail in connection with the accompanying drawings, in which:

FIGURE 1 is an end elevation of the apparatus showing the feed trough and cutting blade, FIGURE 2 is a plan view of the apparatus, FIGURE 3 is a section taken substantially on the line 3—3 of FIGURE 1, FIGURE 4 is a side view of the apparatus looking at the left hand side thereof as seen in FIGURE 1, FIGURE 5 is an enlarged horizontal section taken substantially on the line 5—5 of FIGURE 3, FIGURE 6 is a vertical section taken on the line 6—6 of FIGURE 1, and FIGURE 7 is a fragmentary sectional view taken on the line 7—7 of FIGURE 6.

Referring to the drawings, 10 is fish cutting and feeding apparatus according to the present invention including a substantially horizontal feed trough 12 swingably mounted near its outer end 13 on a shaft 14. This trough has an inner end 16 which is reciprocated up and down and just clear of an endless cutting blade 18 which operates in a horizontal plane and extends around pulleys 19 and 20, one of which is driven by a motor 21.

Feeding trough 12 has conveyor chains 25 extending horizontally along the bottom thereof around sprockets 26 and 27, said chains having pins 29 projecting outwardly therefrom. Sprockets 26 are fixedly mounted on shaft 14, while sprockets 27 are fixedly mounted on another shaft 32, which is journalled in side walls 33 of the trough.

Trough 12 has a bottom 35 extending between sides 33 which is positioned just beneath the top run of conveyor chains 25, said chains travelling through openings 36 in said bottom. A plurality of ribs 39 extend along bottom 35 near inner end 16 of the trough and project upwardly from said bottom, see FIGURE 7.

The inner end 16 of trough 12 is adapted to swing up and down, and it is spring loaded in an upper position by means of a rod 42 which is pivotally connected at its upper end by pin 43 to trough 12 near shaft 14, see FIGURE 1. The lower end of rod 42 extends through a bracket 45 and has a stop 47 adjustably mounted on its lower end. A coil spring 49 mounted on rod 42 extends between bracket 45 and a stop 50 adjustably mounted on said rod. Spring 49 permits the end 16 of the trough to swing downwardly, and returns it to a normal position which is determined by stop 47 engaging bracket 45.

A clamping arrangement generally indicated by the numeral 55 is provided for holding the fish while they are being cut. This clamping arrangement includes side arms 57 which are outside trough 12 and extend parallel thereto, said arms being swingably mounted on shaft 14. A bridge 59 extends between arms 57 and is spaced above trough 12. Shaft 32 extends through vertical slots 62 in side arms 57, and carry bearings 63 which ride in said slots. Bridge 59 carries a clamping block 66 which has a serrated lower end 67 which is normally spaced above cutting blade 18 but is movable downwardly past said blade. A holding spring 69 is connected to block 66 and extends towards the outer end 13 of trough 12.

The clamping arrangement 55 is swung up and down around shaft 14 by means of a link 72 which is pivotally connected by a pin 73 to the bottom of both of the arms 57, the opposite end of said link being pivotally connected by a pin 75 to an arm 76 fixedly mounted on the shaft 77 of a gear reduction unit 78 which is driven by a motor 80 through a chain drive 81. Arm 76 carries a pin 84 at its outer end which is located approximately 90° around shaft 77 from pin 75. This pin 84 is adapted to enter the slots of a Geneva wheel 86 mounted on a shaft 87, said Geneva wheel being periodically rotated by pin 84 and the remainder of the time being held stationary by disc 89 in the usual manner. Thus, motor 80 reciprocates clamping arrangement 55 vertically through pin 75 and link 72, and it periodically rotates Geneva wheel 86 through arm 76 and pin 84. A sprocket 90 is fixedly mounted on shaft 87 and is connected by a chain 91 to another sprocket 92 fixedly mounted on shaft 14. Thus, when Geneva wheel 86 is periodically rotated, shaft 14 is rotated to move chains 25. The timing is such that clains 25 are moved when clamping arrangement 55 is near the upper end of its stroke, and they are stationary during the down stroke of said arrangement. Slot 62 permits relative movement between arrangement 55 and trough 12.

When apparatus 10 is in operation, fish are laid on chains 25 in trough 12, and are moved intermittently by said chains towards inner end 16 of the trough where they engage a stop 95, see FIGURE 7, which is located outwardly of blade 18 and in line with the chains. When arrangement 55 is moved downwardly, block 66 presses the fish against ribs 39 and trough bottom 35. Spring 69 prevents the unclamped portion of the fish from flipping upwardly at this time. Continued downward movement of arrangement 55 swings the inner end 16 of trough 12 downwardly so that the clamped fish is moved through cutting blade 18 which is moved by motor 21. The cut-off slice of the fish drops downwardly while the arrangement 55 is moved upwardly. As the arrangement gets near the top of its upper stroke, chains 25 are moved to shift the fish forwardly against stop 95, ready for the next cutting step.

When a slice of fish is severed from the main body of the fish by blade 18, it drops downwardly in a tunnel 98 which has an entrance 99 just behind the blade. This tunnel extends downwardly from the blade and preferably swings into a substantially horizontal section 100, said tunnel having an outlet 106 at its lower end. The tunnel is then in a transverse direction so that the fish slices move therethrough on edge. A rotor 108 of well known can filling apparatus is located at the lower end of the tunnel. This rotor has blocks 110 arranged around the periphery thereof, said blocks being movable circumferentially around the rotor to form a plurality of pockets 112. As each pocket approaches tunnel outlet 106, it is expanded, see pocket 112a in FIGURE 3, and receives fish from the tunnel. As the pocket leaves the tunnel outlet, blocks 110 are shifted to close it, see pocket 112b. As the construction and operation of this type of equipment is well known in the art, it does not require description herein.

A frame 118 is swingably mounted on a shaft 119 and has a vertically reciprocal plunger 121 slidably mounted therein. Frame 118 is located at the lower end of tunnel 98 and is swingable in the plane of said tunnel. Actually, when plunger 121 is in its lowermost position, the side 122 thereof forms a wall extending part way across the lower end of the tunnel at its outlet 106. One side 124 of frame 118 is shortened as indicated at 125 in FIGURE 3 so that plunger 121 moves below the lower end of said shortened side. The opposite side 127 of the frame extends downwardly and terminates at 128 just above the outer surfaces of blocks 110 of rotor 108. Plunger 121 has a rake 130 immediately below its side 122. Frame 118 is swung back and forth on shaft 119 by an arm 133, while plunger 121 is moved up and down in said frame by another arm 135. Frame 118 and its associated elements are well known in the art, as is the operation of said elements.

When frame 118 oscillates laterally in the direction of arrow 137 at the lower end of tunnel 98, plunger 121 is in its uppermost position within the frame so that it moves over fish located within the lower end of the tunnel. As the frame swings back, plunger 121 moves downwardly to press fish therebeneath into an open pocket 112, said pocket and frame moving together at this time. Rake 130 moves the portion of the fish beneath plunger 121 away from the remainder in tunnel 98. As rotor 108 rotates continuously, a circular cutting blade 140, extending tangentially over the outer surface of blocks 110 to near plunger 121 when the latter is in its lowermost position, severs any fish which may be projecting above the open pocket from the fish in said pocket, and this blade forms a top for the pocket when the latter is closed to prevent the fish from being squeezed out of it. At this time, a horizontal plunger, not shown, moves through the closed pocket 112b to press the fish out of it into a waiting can which is held on its side in registry with said pocket. This is standard can-loading equipment.

It is desirable to stop the vertical swinging motion of trough 12 when the density of fish in tunnel 98 reaches a predetermined point. For this purpose, a packing block 150 is mounted for vertical movement on clamping block 66, said packing block being located on the opposite side of blade 18 from said block 66 when trough 12 is in its lowermost position. At this time, packing block 150 projects downwarly a little into tunnel 98. Block 150 is supported by a flat spring 152 which extends over bridge 59 and is secured thereto at the inner end 153 of the spring. The remainder of the spring is free to lift off the bridge, and an adjusting screw 155 bears against the upper surface of spring 152. The adjusting screw 155 extends through and is shiftable along a slot 157 formed in a bracket 158 carried by bridge 59 and extending above spring 152. Slot 157 extends longitudinally of the spring, and screw 155 may be fixed in any desired portion of slot 157 by means of a nut 160. If screw 155 is located near the left hand end of slot 157, as seen in FIGURE 2, the tension of spring 152 is relatively great, whereas the tension of the spring is lessened as the screw is shifted towards the right hand end of said slot.

Motor 80 is preferably a hydraulic motor, in which case a hydraulic spool valve 165 is carried by a bracket 166 extending outwardly from bracket 158 and above packing block 150. Valve 165 has an operating plunger 168 projecting downwardly therefrom towards and terminating just above block 150. Valve 165 forms part of the operating circuit of motor 180 so that when plunger 168 is depressed, the operating fluid for motor 180 is by-passed and disc 89 stops rotating. This stops the movement of the inner end of trough 12. If 80 is an electric motor, 165 would be an electrical switch in the power circuit of the motor to stop said motor when plunger 168 is depressed.

Each time a piece of fish is cut by blade 18, block 150 presses it downwardly in tunnel 98. When the density of the fish in the tunnel reaches a predetermined point, this being determined by adjusting screw 155, block 158 is moved upwardly to depress plunger 168 to stop motor 80. This condition remains until the density of the fish in the tunnel drops as fish is removed from the lower end thereof, at which time block 150 drops downwardly to allow plunger 168 to move in the same direction. Thus, the fish feeding and cutting apparatus functions only when the density of the fish in tunnel 89 is below a predetermined point.

The cut slices of fish may move downwardly through tunnel 98 under gravity alone. However, in some cases it is desirable to provide means for assisting in this downward movement in order properly to pack the fish at the lower end of the tunnel. For this purpose, a disc 173 is mounted for rotation above the horizontal section 100 of tunnel 98. This disc is rotated through a slip clutch 175 by means of a chain drive 176, see FIGURE 5. A pin 178 extends along side of disc 173 and is swingably connected thereto at 179 near the periphery of the disc, see FIGURE 3. The opposite end of the pin slidably extends through a bearing 182 rotatably mounted at 183 at the top edge of tunnel 98. This end of the pin projects through a slot 185 in the top of the tunnel and into said tunnel.

When pin 178 is in the position shown in FIGURE 3, it is practically withdrawn from tunnel 98. As disc 173 rotates in the direction indicated by arrow 186, the pin is moved across the tunnel through the fish therein, and at the same time its lower end is swung downwardly along the tunnel to move the fish towards the tunnel outlet 106. During this action, the lower end of the pin is also drawn towards slot 185.

During the operation of apparatus 10, pieces of fish are cut by blade 18 off the fish as described above, and are pressed down into tunnel 98 by block 150. As stated above, if the density of the fish reaches a predetermined point, block 150 is moved upwardly to operate valve 165 and thereby stop motor 180 until the density drops. If pin 178 is provided, it helps to move the packed fish downwardly through tunnel 98. When frame 118 is swung into its uppermost position with plunger 121 retracted, or moved upwardly, the frame starts to swing downwardly in the general direction of movement of fish through the tunnel while plunger 121 moves downwardly to press the fish into the pocket 112 located beneath said plunger, the frame swinging in the same direction as rotor 108 rotates. Blade 140 trims the fish in the pocket, and then the standard mechanism operates to press the fish out of the pocket into a waiting can.

What I claim as my invention is:

1. Fish cutting and feeding apparatus comprising a cutting blade movable to perform cutting operations, a trough having an end positioned near the blade, means connected to the trough for reciprocating said end thereof past the blade, conveyor means along the bottom of the trough intermittently operable to move fish thereon towards the blade, timing means controlling said conveyor means to cause the latter to move the fish when the trough end is clear of the blade to project outwardly a predetermined distance beyond said trough end, and clamping means in the trough for gripping the fish on the still conveyor as the trough end moves past the blade, during which time the latter cuts the projecting fish from the remainder thereof.

2. Fish cutting and feeding apparatus comprising a blade having an upwardly extending cutting edge and movable to perform cutting operations, a substantially horizontal trough having an end positioned near the blade, means connected to the trough for reciprocating said end vertically past the blade, means in the trough for intermittently moving fish therein towards the blade, timing means controlling said moving means to cause the latter to move the fish when the trough end is above the blade to project outwardly a predetermined distance beyond said trough end, clamping means in the trough for gripping the fish therein as the trough end moves past the blade, during which time the latter cuts the projecting fish from the remainder thereof, a tunnel extending downwardly from the blade, said tunnel having an entrance near the blade on the side thereof remote from the trough to receive the cut projecting fish, said trough being shaped to maintain the cut fish on edge during movement therethrough, and packing means movable with the trough positioned to extend through the tunnel entrance after the cut projecting fish has entered said tunnel and adapted to pack the fish therein.

3. Apparatus as claimed in claim 2 in which the packing means is adapted to move upwardly relative to the trough when the fish in the tunnel reaches a predetermined density, and including means operated by the packing means when the latter is moved upwardly to stop the downward movement of trough and the fish moving means therein, said packing means moving downwardly relative to the trough when the fish density is reduced, at which time said means operated by the packing means operates to permit movement of the trough and the fish moving means.

4. Apparatus as claimed in claim 3 in which the tunnel has an outlet at a lower end thereof, and including can filling apparatus at said lower end for receiving fish passing through said outlet.

5. Fish cutting and feeding apparatus comprising a cutting blade movable to perform cutting operations, a substantially horizontal trough pivotally mounted for vertical reciprocating action and having an inner end adjacent and movable past the blade, means connected to the trough resiliently urging said trough to an upper position, conveyor means along the bottom of the trough upon which fish can lie and intermittently operable to move fish thereon towards the blade, timing means controlling said conveyor means to cause the latter to move the fish when the trough end is clear of the blade to project outwardly a predetermined distance beyond said trough end and to stop said conveyor means when the trough end is moved to the blade, a clamping arrangement straddling the trough, power means connected to the clamping arrangement for reciprocating the latter vertically, and pressure means carried by the clamping arrangement and extending into the trough in the inner end thereof adapted to bear against fish in the trough when the conveying means is stopped and the clamping arrangement moves downwardly to move the trough in the same direction, during which time the blade cuts the projecting fish from the remainder thereof.

6. Fish cutting and feeding apparatus comprising a cutting blade movable to perform cutting operations, a substantially horizontal trough pivotally mounted for vertical reciprocating action and having an inner end adjacent and movable past the blade, means connected to the trough resiliently urging said trough to an upper position, means in the trough for intermittently moving fish therein towards the blade, timing means controlling said moving means to cause the latter to move the fish when the trough end is clear of the blade to project outwardly a predetermined distance beyond said trough end, a clamping arrangement straddling the trough and having a bridge extending over the inner end of the trough, power means connected to the clamping arrangement for reciprocating the latter vertically, a clamping block secured to said bridge and extending downwardly into the trough near the inner end thereof adapted to bear against fish in the trough when the clamping arrangement moves downwardly to move the trough in the same direction, during which time the blade cuts the projecting fish from the remainder thereof.

7. Apparatus as claimed in claim 6 including a holding spring mounted on the clamping block and extending away from the trough inner end over the fish moving means.

8. Apparatus as claimed in claim 6 including a tunnel extending downwardly from the blade, said tunnel having an entrance near the blade on the side thereof remote from the trough to receive the cut projecting fish, said trough being shaped to maintain the cut fish on edge during movement therethrough.

9. Apparatus as claimed in claim 8 including a packing block mounted for vertical movement on the clamping arrangement and positioned to project into the tunnel entrance when said arrangement is moved downwardly and adapted to pack fish in the tunnel, and adjustable pressure means for resisting upward movement of the packing block when said block is pressed against the fish in the tunnel.

10. Apparatus as claimed in claim 9 including means operated by the packing block when the latter is moved upwardly relative to the clamping arrangement to stop the trough and the fish moving means therein as long as the block remains in the position.

11. Apparatus as claimed in claim 8 including means at the tunnel for moving fish therealong away from the entrance thereof.

12. Apparatus as claimed in claim 11 in which the means at the tunnel for moving fish comprises a disc mounted for rotation outwardly from en edge of the tunnel, a long pin having an end pivotally connected to said disc at a point spaced outwardly from the centre of rotation thereof, said pin extending substantially parallel to the disc and having an opposite end extending into the tunnel, and a bearing rotatably mounted near the tunnel and through which said pin slidably extends, said other end of the pin being moved into, across and downwardly of the trough and being substantially withdrawn from the trough during each revolution of the disc.

13. Apparatus as claimed in claim 8 in which the tunnel has an outlet at a lower end thereof, and including can filling apparatus at said lower end for receiving fish passing through said outlet.

14. Fish cutting and feeding apparatus comprising a cutting blade movable to perform cutting operations, a substantially horizontal trough pivotally mounted on a shaft adjacent an outer end and having an inner end adjacent and movable past the blade, means connected to the trough resiliently urging said trough to an upper position, conveyor means in and extending longitudinally of the trough for moving fish towards the inner end thereof and to cause said fish to project beyond said inner end, a clamping arrangement straddling and extending longitudinally of the trough and pivotally mounted near one end on said shaft, a Geneva wheel connected to said conveyor means to move the latter, operating means for intermittently rotating said wheel and connected to the clamping arrangement to vertically reciprocate the opposite end thereof, power means operatively connected to said operating means, and pressure means connected by the clamping arrangement and extending into the trough in the inner end thereof adapted to bear against fish in the trough when the clamping arrangement moves downwardly to move the trough in the same direction, during which time the blade cuts the projecting fish from the remainder thereof.

15. Apparatus as claimed in claim 14 including a tunnel extending downwardly from the blade, said tunnel having an entrance near the blade on the side thereof remote from the trough to receive the cut projecting fish, said trough being shaped to maintain the cut fish on edge during movement therethrough.

16. Apparatus as claimed in claim 15 including a packing block mounted for vertical movement on the clamping arrangement and positioned to project into the tunnel entrance when said arrangement is moved downwardly and adapted to pack fish in the tunnel, and adjustable pressure means for resisting upward movement of the packing block when said block is pressed against the fish in the tunnel.

17. Apparatus as claimed in claim 16 including means operated by the packing block when the latter is moved upwardly relative to the clamping arrangement to stop said power means until the density of the fish in the tunnel is lessened to permit said packing block to move downwardly relative to the clamping arrangement, at which time the power means again starts to operate.

18. Fish cutting and feeding apparatus comprising an endless cutting blade operating in a horizontal plane and extending around spaced pulleys, power means connected to one of said pulleys to rotate the latter, a substantially horizontal trough pivotally mounted on a shaft adjacent an outer end and extending towards a horizontal section of the cutting blade, said trough having an inner end adjacent and movable past said horizontal section of the blade, means connected to the trough resiliently urging said trough to an upper position above the cutting blade, conveyor means in and extending longitudinally of said trough for moving fish towards the inner end thereof, timing means controlling said conveyor means to cause the latter to move the fish when the trough inner end is above the blade to project outwardly a predetermined distance beyond said inner end, a clamping arrangement straddling the trough and having a bridge extending over the inner end of the trough, power means connected to the clamping arrangement for reciprocating the latter vertically, a clamping block secured to said bridge and extending downwardly into the trough near the inner end thereof adapted to bear against fish in the trough when the clamping arrangement moves downwardly to move the trough in the same direction, during which time the endless blade cuts the projecting fish from the remainder thereof.

19. Fish cutting and feeding apparatus comprising a cutting blade movable to perform cutting operations, a substantially horizontal trough pivotally mounted on a shaft adjacent an outer end and having an inner end adjacent and movable past the blade, means connected to the trough resiliently urging said trough to an upper position, conveyor means in and extending longitudinally of the trough for moving fish towards the inner end thereof and to cause said fish to project beyond said inner end, a clamping arrangement straddling and extending longitudinally of the trough and pivotally mounted near one end on said shaft, a slotted Geneva wheel connected to said conveyor means to move the latter, an arm having a pin projecting laterally therefrom near an end thereof and mounted for rotation near the Geneva wheel so that said pin can enter the slots thereof and intermittently rotate said wheel, means for retaining the wheel stationary when said pin is clear of the slots thereof, power means connected to said arm to rotate the arm, a link having one end connected to said arm and an opposite end connected to the clamping arrangement to vertically reciprocate the opposite end of said arrangement, the connection of the link to the arm being such that the wheel is rotated when the trough is near said upper position, and pressure means connected by the clamping arrangement and extending into the trough in the inner end thereof adapted to bear against fish in the trough when the clamping arrangement moves downwardly to move the trough in the same direction, during which time the blade cuts the projecting fish from the remainder thereof.

References Cited
UNITED STATES PATENTS

| | | | |
|---|---|---|---|
| 2,007,219 | 7/1935 | Singer | 146—88 |
| 2,037,724 | 4/1936 | Jacobs et al. | 53—123 |
| 2,044,813 | 6/1936 | Rooney | 53—123 X |
| 2,455,944 | 12/1948 | Nordquist. | |
| 2,911,776 | 11/1959 | Sada | 53—123 X |

TRAVIS S. McGEHEE, *Primary Examiner.*

LUCIE H. LAUDENSLAGER, *Examiner.*

R. L. FARRIS, *Assistant Examiner.*